US009765719B2

(12) United States Patent
Umeno

(10) Patent No.: US 9,765,719 B2
(45) Date of Patent: Sep. 19, 2017

(54) CONTROL UNIT FOR A GAS CONCENTRATION SENSOR

(71) Applicant: DENSO CORPORATION, Kariya, Aichi-pref. (JP)

(72) Inventor: Masafumi Umeno, Okazaki (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 14/681,159

(22) Filed: Apr. 8, 2015

(65) Prior Publication Data

US 2015/0362456 A1 Dec. 17, 2015

(30) Foreign Application Priority Data

Jun. 13, 2014 (JP) ................................ 2014-122551

(51) Int. Cl.

*G01N 27/406* (2006.01)
*F02D 41/14* (2006.01)
*F02D 41/30* (2006.01)

(52) U.S. Cl.

CPC ..... *F02D 41/1496* (2013.01); *F02D 41/1456* (2013.01); *F02D 41/1494* (2013.01)

(58) Field of Classification Search

CPC ............. F02D 41/1483; F02D 41/1461; F02D 41/1474; F02D 41/146; F02D 41/1455; F02D 41/1456; F02D 41/1495; F02D 41/1496; F02D 41/1494; F02D 41/1444; F02D 41/30; G01N 27/4065; G01N 27/02

See application file for complete search history.

(56) References Cited

U.S. PATENT DOCUMENTS 5,833,836 A 11/1998 Takami et al.
2011/0279129 A1* 11/2011 Suzuki .............. G01N 27/4065 324/649

FOREIGN PATENT DOCUMENTS

JP H8-8742 B2 1/1996
JP 2011-520112 A 7/2011

* cited by examiner

*Primary Examiner* — Gurpreet Kaur
(74) *Attorney, Agent, or Firm* — Posz Law Group, PLC

(57) ABSTRACT

A control circuit includes a sweep circuit for supplying a sweep current to a gas concentration sensor, a current detection resistor for detecting a sensor current flowing in the gas concentration sensor, a calculation circuit for calculating an impedance of the gas concentration sensor based on the sensor current and an inter-terminal voltage of the gas concentration sensor, and a protective element for suppressing external noise from being applied to the sweep circuit and the calculation circuit. The sweep current is divided to flow in a first protective element and the gas concentration sensor. The sensor current is divided to flow in a second protective element and the current detection resistor. The calculation circuit calculates a loss current flowing to the first protective element or a second loss current flowing to the second protective element and calculates the sensor current based on the calculated current.

6 Claims, 3 Drawing Sheets

CONTROL UNIT FOR A GAS CONCENTRATION SENSOR

CROSS REFERENCE TO RELATED APPLICATION

This application is based on Japanese patent application No. 2014-122551 filed on Jun. 13, 2014, the content of which is incorporated herein by reference.

FIELD

The present disclosure relates to a control unit for a gas concentration sensor.

BACKGROUND

Patent document JP H09-229901A discloses an oxygen concentration detection device, which includes a limiting-current type oxygen sensor for detecting an air-fuel ratio of exhaust gas, a bias control circuit for supplying a voltage to the limiting-current type oxygen sensor, and a current detection circuit for detecting a current flowing in the limiting-current type oxygen sensor. The limiting-current type oxygen sensor and the bias control circuit are connected electrically through two conductive wires, which are connected to an exhaust gas-side electrode and an atmospheric air-side electrode of the limiting-current type oxygen sensor, respectively. A voltage is supplied from the bias control circuit to the limiting-current type oxygen sensor through the two conductive wires. With this voltage application, a current flows in the limiting-current type oxygen sensor. The current detection circuit includes a current detection resistor, which is provided in the conductive wire. An air-fuel ratio is detected based on the current flowing in the current detection resistor.

In the oxygen concentration detection device disclosed in the above-referenced patent document, grounding wires are connected to the conductive wires, which electrically connect the limiting-current type oxygen sensor and the bias control circuit, respectively. A capacitor is provided in the grounding wire. The current detection resistor is provided in the conductive wire. According to this configuration, since a part of the current flowing in the limiting-current type oxygen sensor flows into the capacitor, the current (sensor current) flowing in the limiting-current type oxygen sensor cannot be detected with high accuracy.

SUMMARY

It is therefore an object to provide a control unit for detecting a sensor current of a gas concentration sensor with improved accuracy.

According to one aspect, a control circuit for a gas concentration sensor comprises: a sweep circuit for supplying a sweep current to a gas concentration sensor, a current value of the sweep current being variable with time; a current detection resistor for detecting a sensor current flowing in the gas concentration sensor; a calculation circuit for calculating an impedance of the gas concentration sensor based on the sensor current flowing in the gas concentration sensor and an inter-terminal voltage of the gas concentration sensor; protective elements for suppressing external noise from being applied to the sweep circuit and the calculation circuit; a first grounding wire connected to a first wire, which connects the sweep circuit and a first terminal of the gas concentration sensor; and a second grounding wire connected to a second wire, which connects a second terminal of the gas concentration sensor and the current detection resistor. The protective elements include a first protective element and a second protective element. The first protective element is provided in the first grounding wire and causes the sweep current supplied from the sweep circuit to be divided to flow to the first protective element and the gas concentration sensor. The second protective element is provided in the second grounding wire and causes the sensor current flowing in the gas concentration sensor to be divided to flow to the second protective element and the current detection resistor. The calculation circuit calculates a first loss current flowing to the first protective element or a second loss current flowing to the second protective element, and calculates the sensor current flowing in the gas concentration sensor by using a calculated loss current.

EMBODIMENT

A control unit for controlling a gas concentration sensor will be described below with reference to an embodiment, which is incorporated in a fuel injection system for an internal combustion engine to detect an oxygen concentration contained in exhaust gas of an internal combustion engine.

Figure 1:
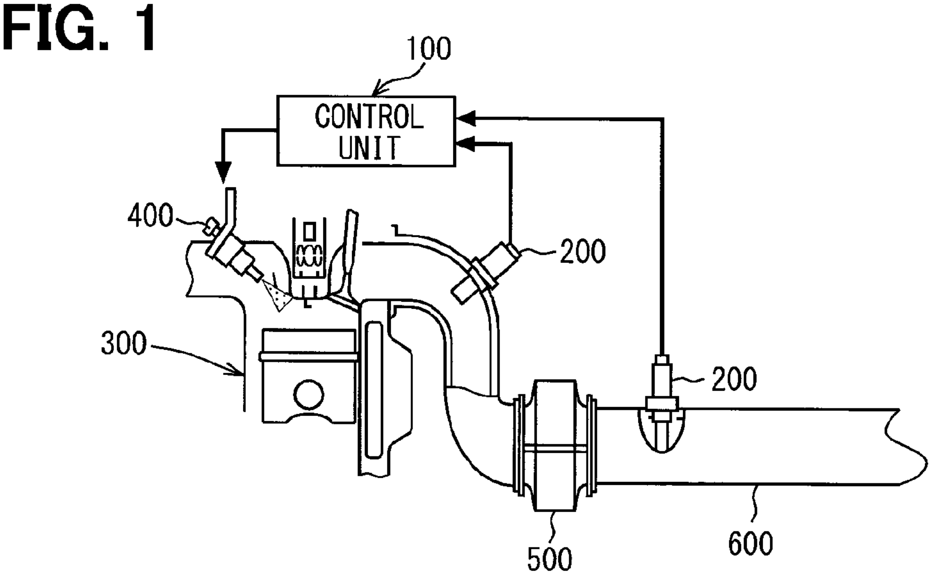
FIG. 1 is a systematic view showing an electronic control unit incorporated in a fuel injection system for an internal combustion engine.

Referring to FIG. 1, gas concentration sensors 200 are provided in an exhaust pipe 600, into which exhaust gas is emitted from an internal combustion engine 300, to output signals corresponding to concentrations of exhaust gas to an electronic control unit 100. The control unit 100 controls a fuel injection quantity of a fuel injection system 400 based on not only output signals of the gas concentration sensors 200 but also information of the internal combustion engine 300 such as a rotation speed, intake air quantity and the like of the internal combustion engine 300.

Each gas concentration sensor 200 varies its output voltage in accordance with an air-fuel ratio A/F (oxygen concentration indicative of a ratio of air and fuel) contained in the exhaust gas. Specifically, when the air-fuel ratio of the exhaust gas is lower (oxygen concentration is low because of fuel-rich mixture) than a stoichiometric air-fuel ratio, at which air and fuel react ideally in the internal combustion engine 300 to attain complete fuel combustion, the gas concentration sensor 200 outputs an output voltage, which is higher than that of the stoichiometric air-fuel ratio. When the air-fuel ratio is higher than the stoichiometric air-fuel ratio (oxygen concentration is high because of fuel-lean mixture), the gas concentration sensor 200 outputs the output voltage, which is lower than that of the stoichiometric air-fuel ratio. The control unit 100 therefore decreases the fuel injection quantity of the fuel injection system 400 to increase the oxygen concentration when the output voltage of the gas concentration sensor 200 increases. The control unit 100 increases the fuel injection quantity of the fuel injection system 400 to decrease the oxygen concentration when the output voltage of the gas concentration sensor 200 decreases. The control unit 100 thus controls the air-fuel ratio of the exhaust gas of the internal combustion engine 300 to the stoichiometric air-fuel ratio. The stoichiometric air-fuel ratio of oxygen and fuel is 14.7:1.

As shown in FIG. 1, the gas concentration sensors 200 are provided at an upstream side and a downstream side of a three-way catalytic converter 500 provided in the exhaust pipe 600. The three-way catalytic converter 500 is capable of oxidizing and reducing hydrocarbon, carbon monoxide and nitrogen oxides contained in the exhaust gas. The gas concentration sensors 200 provided at the upstream side and the downstream side of the three-way catalytic converter 500 is an A/F sensor and an $O_2$ sensor, respectively. The A/F sensor is provided at the upstream side to detect a deviation of the air-fuel ratio of the exhaust gas from the stoichiometric air-fuel ratio at earlier time. The $O_2$ sensor is provided at the downstream side to enhance accuracy of air-fuel ration detection.

Figure 2:
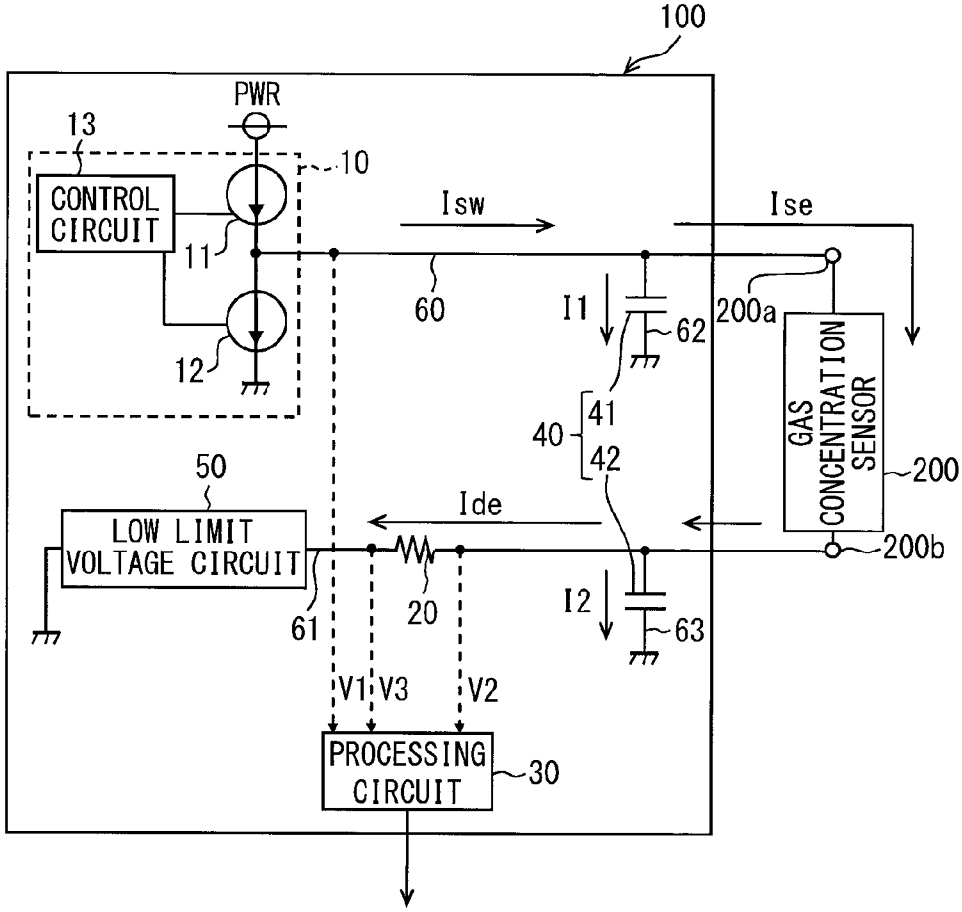
FIG. 2 is a circuit diagram showing a general configuration of the control unit connected to a gas concentration sensor.

Each of the gas concentration sensors 200 described above is a limiting-current type oxygen sensor, which is conventional. Although not shown, the gas concentration sensor 200 is formed by stacking on a diffusion resistance layer a first electrode, a solid electrolyte and a second electrode sequentially. The diffusion resistance layer is formed of porous alumina having micro holes. The first electrode and the second electrode are formed of platinum. The solid electrolyte is a zirconia solid electrolyte. The exhaust gas flows in the first electrode through the diffusion resistance layer. The second electrode is exposed to atmospheric air, which is a reference gas. As shown in FIG. 2, the first electrode is connected to a first terminal 200*a* of the gas concentration sensor 200. The second electrode is connected to a second terminals 200*b* of the gas concentration sensor. In the following description, the first electrode and the second electrode are referred to as an exhaust-side electrode and an air-side electrode.

When the air-fuel ratio of the exhaust gas is higher than the stoichiometric air-fuel ratio (the air-fuel ratio of the exhaust gas is lean), oxygen molecule contained in the exhaust gas are taken into the exhaust-side electrode. The oxygen molecule, which is taken in, is ionized and moves to the solid electrolyte and then to the air-electrode through the solid electrolyte. At the air-side electrode, the ionized oxygen is restored to the oxygen molecule and emitted into air. Thus, when the air-fuel ratio of the exhaust gas is lean, the ionized oxygen flows from the exhaust-side electrode to the air-side electrode. That is, when the air-fuel ratio is lean, current flows from the air-side electrode to the exhaust-side electrode. On the other hand, when the air-fuel ratio of the exhaust gas is lower than the stoichiometric air-fuel ratio (the air-fuel ratio of the exhaust gas is rich), oxygen molecule contained in the air is taken into the air-side electrode. The oxygen molecule, which is taken in, is ionized and moves to the solid electrolyte and then to the exhaust-side electrode through the solid electrolyte. At the exhaust-side electrode, the ionized oxygen is restored to the oxygen molecule and emitted into the exhaust gas. The oxygen molecule emitted from the exhaust-side electrode reacts with unburned gases (carbon monoxide, hydrogen chloride and the like) contained in the exhaust gas. Thus, when the air-fuel ratio of the exhaust gas is rich, the ionized oxygen flows from the air-side electrode to the exhaust-side electrode. That is, when the air-fuel ratio is rich, current flows from the exhaust-side electrode to the air-side electrode.

When the voltage supplied to the gas concentration sensor 200 is low, the current flowing in the gas concentration sensor 200, which is referred to as a sensor current below, varies in accordance with the supply voltage and a resistance value of the gas concentration sensor 200. When the supply voltage exceeds a predetermined voltage value, the sensor current saturates. When the air-fuel ratio of the exhaust gas is lean, the oxygen molecule contained in the exhaust gas, which is taken in, are limited by the diffusion resistance layer. As a result, the sensor current saturates. When the air-fuel ratio of the exhaust gas is rich, reaction of the unburned gas with the oxygen molecule is limited by the diffusion resistance layer. As a result, the sensor current saturates. Since the sensor current thus saturates, the limiting-current flows in the gas concentration sensor 200.

The limiting-current described above is in direct proportion to the oxygen concentration (air-fuel ratio) contained in the exhaust gas. For this reason, it is possible to detect the oxygen concentration by detecting the limiting-current. An impedance of the gas concentration sensor 200 is dependent on temperature. It is therefore also possible to detect the temperature of the gas concentration sensor 200 based on the temperature dependency characteristic by calculating the impedance based on the supply voltage to the gas concentration sensor 200 and the sensor current. Further, the supply voltage, at which the limiting-current starts to flow in the gas concentration sensor 200 (predetermined voltage value described above) is in inverse proportion to temperature. It is therefore possible to regulate the predetermined voltage value not to vary with temperature by regulating the temperature of the gas concentration sensor 200 at a constant value by a heater or the like. It is alternatively possible to regulate the predetermined value to cause flow of the limiting-current by increasing and decreasing the temperature of the gas concentration sensor 200 by the heater or the like.

Although the control unit 100 is configured to calculate the temperature of the gas concentration sensor 200 based on the above-described characteristic of the gas concentration sensor 200, the control unit 100 will be described below in connection with the A/F sensor, which is one of the two gas concentration sensors 200 provided at an upstream side of the three-way catalytic converter 500. The control unit 100 operates in the similar manner as described below even in a case of the $O_2$ sensor provided at a downstream side of the three-way catalytic converter 500.

As shown in FIG. 2, the control unit 100 includes a sweep circuit 10, a current detection resistor 20, a processing circuit 30 and protective elements 40. The processing circuit 30 may be a programmed computer such as a microcomputer. The sweep circuit 10 is for supplying the current and the voltage to the gas concentration sensor 200. The current detection resistor 20 is for detecting the current flowing in the gas concentration sensor 200. The processing circuit 30 is for calculating the temperature of the gas concentration sensor 200 and for controlling the fuel injection system 400 based on the output signals (output voltage and sensor current) of the gas concentration sensor 200. The protective elements 40 suppress external noise from entering into internal circuits of the control unit 100 (sweep circuit 10, processing circuit 30 and low-limit generation circuit 50 described below).

As shown in FIG. 2, a power source PWR is connected to the first terminal 200*a* of the gas concentration sensor 200 via a first wire 60. The second terminal 200*b* of the gas concentration sensor 200 and the ground are connected via a second wire 61. The sweep circuit 10 is provided in the first wire 60. The current detection resistor 20 is provided in the second wire 61. A first grounding wire 62 is connected to the first wire 60 at a position between the sweep circuit 10 and the first terminal 200*a*. A second grounding wire 63 is connected to the second wire 61 at a position between the second terminal 200*b* and the current detection resistor 20. The protective elements 40 include a first protective element 41 and a second protective element 42, which are capacitors. The first protective element 41 is provided in the first grounding wire 62. The second protective element 42 is provided in the second grounding wire 63.

With the circuit configuration described above, when a sweep current Isw is supplied from the sweep circuit 10 to the first wire 60, a sensor current Ise flows between the control unit 100 and the gas concentration sensor 200 as indicated by a solid arrow in FIG. 1. That is, the sweep current Isw supplied to the first wire 60 is divided to flow in the first protective element 41 and the gas concentration sensor 200. A first loss current I1 flows in the first protective element 41. The sensor current Ise flows in the gas concentration sensor 200. The sensor current Ise flowing in the gas concentration sensor 200 is divided to flow in the second protective element 42 and the current detection resistor 20. A second loss current I2 flows in the second protective element 42. A detection current Ide flows in the current detection resistor 20. The processing circuit 30 calculates the sensor current Ise based on the currents Isw, Ide, a first voltage V1 developed between the sweep circuit 10 and the first protective element 41, and terminal voltages V2, V3 of the current detection resistor 20. The processing circuit 30 further calculates the temperature of the gas concentration sensor 200 based on the sensor current Ise calculated by the processing circuit 30.

The control unit 100 further includes a low limit voltage generation circuit 50 in addition to the structural parts described above, as shown in FIG. 1. The low limit voltage generation circuit 50 is provided in the second wire 61 and between the current detection resistor 20 and the ground. With the low limit voltage generation circuit 50, the low limit voltage of the control unit 100 is maintained to be higher than the ground potential. When the sweep circuit 10 generates a voltage, which is higher than the ground potential and lower than the low limit voltage, the direction of flow of the sweep current Isw is reversed as described below. The structural elements 10, 20, 30 and 40 of the control unit 100 will be described first below. Then the calculation processing of the sensor current Ise of the processing circuit 30 will be described.

Figure 3:
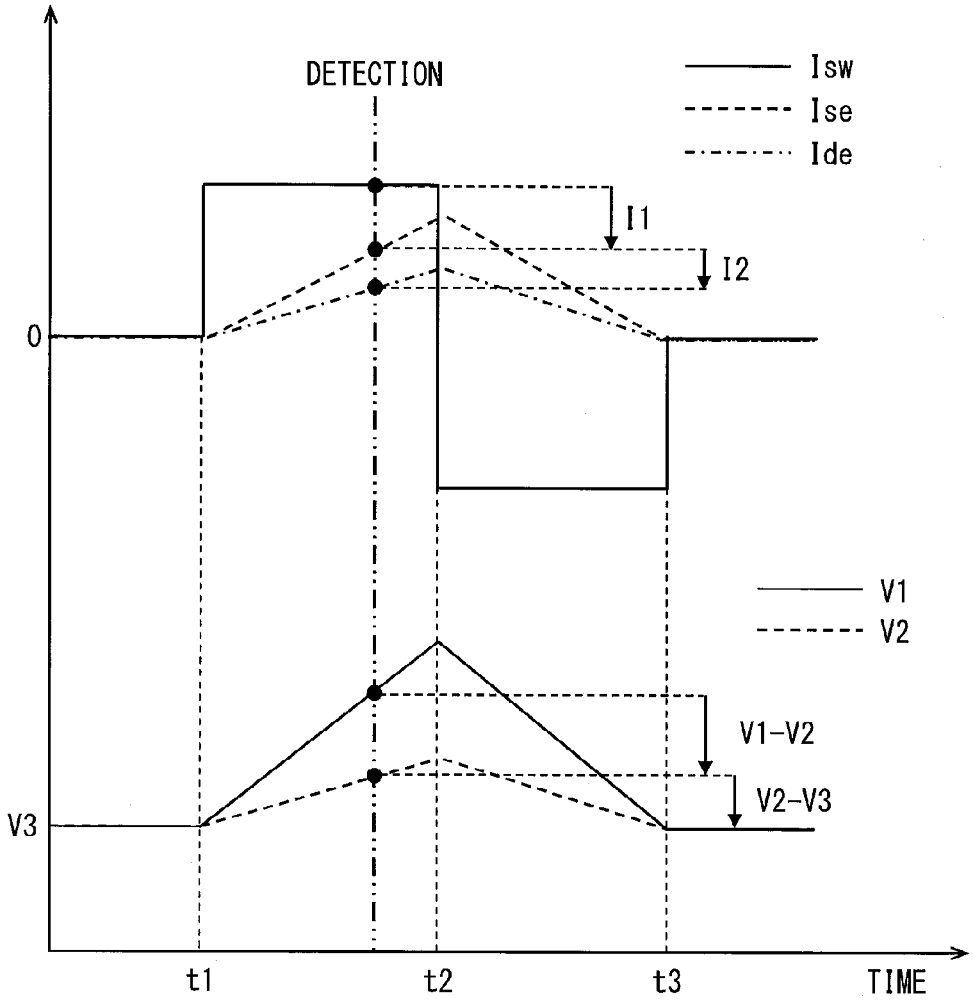
FIG. 3 is a time chart showing changes in a current and a voltage indicated in FIG. 2.

The sweep circuit 10 is configured to supply the sweep current Isw, the current value of which is reversed, to the gas concentration sensor 200. The sweep circuit 10 includes constant current circuits 11, 12 and a control circuit 13. The control circuit 13 is configured to control driving conditions of the constant current circuits 11 and 12 to vary the current value of the sweep current Isw with respect to time. As shown in FIG. 3, a current value of the sweep current Isw indicated by a solid line rises from zero to a maximum current value in a stepwise matter at time t1, varies from the maximum current value to a minimum current value at time t2 thereby reversing the direction of current flow, and returns to zero from the minimum current value at time t3. As the current value of the sweep current Isw increases, the current flows from the first wire 60 to the second wire 61 and the sensor current Ise indicated by a dotted line and the detection current Ide indicated by a one-dot chain line start to flow. The voltage V1 indicated by a solid line and the voltage V2 indicated by a dotted line also start to rise.

However, since the sweep current Isw is divided to flow into the first protective element 41 and the gas concentration sensor 200, the current value of the sensor current Ise is lower than that of the sweep current Isw by an amount of the first loss current I1. Similarly, since the sensor current Ise is divided to flow into the second protective element 42 and the current detection resistor 20, the current value of the detection current Ide is lower than that of the sensor current Ise by an amount of the second loss current I2. While the current continues to flow from the first wire 60 to the second wire 61 in a period between time t1 and time t2 in response to an increase of the current value of the sweep current Isw, the processing circuit 30 detects the currents Isw, Ide and the voltages V1, V2 at time indicated by two-dot chain line in FIG. 3. As described above, after the current value of the sweep current Isw increases, the sweep current Isw is changed to flow in the reverse direction from the second wire 61 to the first wire 60. This change is caused by a discharge of charges stored in the gas concentration sensor 200 and the protective elements 40 in correspondence to the supply of the sweep current Isw. It is noted that waveforms shown in FIG. 3 is simplified to simplify variations of the currents and the voltages described above. For example, the sweep current Isw shown in a rectangular waveform in FIG. 3 may be in waveforms other than the rectangular waveform.

Figure 4:
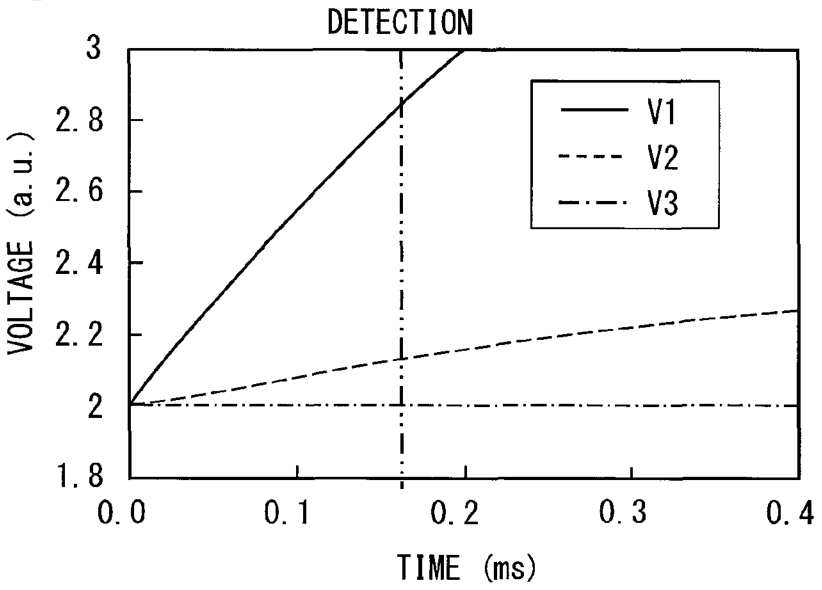
FIG. 4 is a graph showing changes in voltages V1 to V3 detected actually with respect to time.

Examples of the voltages V1 to V3, which were actually detected in experiments, are shown in FIG. 4. FIG. 4 shows variations of the voltages V1 to V3 with respect to time in the period from time t1 to time t2. The third voltage V3 indicated by a one-dot chain line remains constant with respect to time. However, the voltage V1 indicated by a solid line and the voltage V2 indicated by a dotted line rise in correspondence to the impedance of the gas concentration sensor 200 and the capacitances of the protective elements 40.

The current detection resistor 20 is provided to detect the sensor current Ise. Since the detection current Ide is smaller than the sensor current Ise by the amount of the second loss current I2 as described above, the sensor current Ise is detected by adding the second loss current I2 to the detection current Ide. The second loss current I2 is calculated by the processing circuit 30 as described below.

As described above, the processing circuit 30 detects whether the air-fuel ratio of the exhaust gas is lower or higher than the stoichiometric ratio based on the output voltage of the gas concentration sensor 200 and controls the fuel injection quantity of the fuel injection system 400. The output voltage of the gas concentration sensor 200 increases and decreases when the air-fuel ratio of the exhaust gas is lower and higher than the stoichiometric ratio as described above, respectively. This variation of the output voltage is included in the voltage (first voltage V1) of the first terminal 200*a*. For this reason, the first voltage V1 increases and decreases when the air-fuel ratio of the exhaust gas is lower and higher than the stoichiometric ratio, respectively. Thus the processing circuit 30 detects whether the air-fuel ratio of the exhaust gas is lower or higher than the stoichiometric ratio by detecting the variation of the first voltage V1 and controls the fuel injection quantity of the fuel injection system 400.

Figure 5:
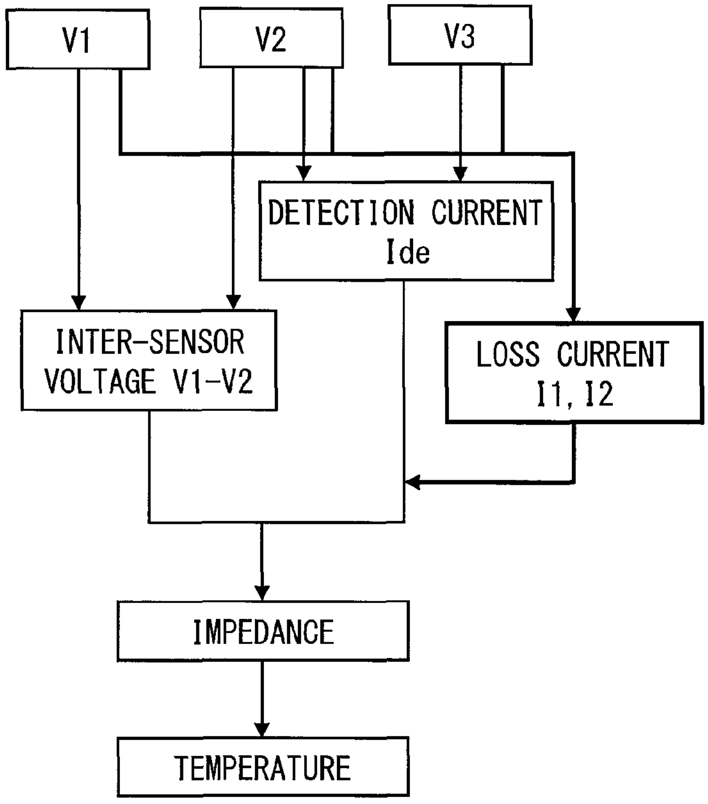
FIG. 5 is a schematic view showing generally processing of impedance calculation in a processing circuit.

The processing circuit 30 calculates, as shown generally in FIG. 5, the impedance of the gas concentration sensor 200 and the temperature of the gas concentration sensor 200 based on the calculated impedance. The processing circuit 30 first calculates a sensor voltage V1-V2, which is an inter-terminal voltage supplied between the terminals 200*a* and 200*b* of the gas concentration sensor 200, based on the voltages V1 and V2. The processing circuit 30 then calculates the detection current Ide based on an inter-terminal voltage V2-V3 of the current detection resistor 20 and the resistance value of the current detection resistor 20. The resistance value of the current detection resistor 20 is pre-stored in a memory of the processing circuit 30. As described below, the processing circuit 30 calculates the sensor current Ise based on the voltages, V1 to V3 and the currents Ise, Ide. The processing circuit 30 then calculates the impedance of the gas concentration sensor 200 based on the sensor voltages V1-V2 and the sensor currents Ise calculated up to this time. The processing circuit 30 calculates the temperature of the gas concentration sensor 200 based on the calculated impedance and the temperature characteristic of the impedance of the gas concentration sensor 200. This temperature characteristic is pre-stored in the memory in the processing circuit 30. The processing circuit 30 thus corresponds to a calculation circuit.

The protective elements 40 are for suppressing the external noise from being applied to the internal circuits of the control unit 100, when the external noise is applied to the terminals of the control unit 100, which are connected to the gas concentration sensor 200. The protective elements 40 include the first protective element 41, which is provided in the first grounding wire 62, and the second protective element 42, which is provided in the second grounding wire 63. The first and second protective elements 41 and 42 are capacitors. The first protective element 41 has a first capacitance C1 and the second protective element 42 has a second capacitance C2. The capacitances C1 and C2 are equal to each other. For this reason, a ratio between the first loss current I1 flowing in the first protective element 41 and the second loss current I2 flowing in the second protective element 42 is equal to a ratio between a voltage variation V1-V2 of the first protective element 41 and a voltage variation V2-V3 of the second protective element 42.

The processing circuit 30 calculates the sensor current Ise by way of the following processing. As shown in FIG. 1, the sweep current Isw is divided into the first loss current I1 and the sensor current Ise. The sensor current Ise is divided into the second loss current I2 and the detection current Ide. The loss currents I1 and I2 are lost while the current flows from the sweep circuit 10 to the current detection resistor 20. For this reason, the following relation expressed as equation [1] holds. This relation indicates that the detection current Ide is equal to a value, which is calculated by subtracting the loss currents I1 and I2 from the sweep current Isw.

$$Isw-I1-I2=Ide \qquad [1]$$

The first loss current I1 is equal to a value, which is calculated by multiplying the first capacitance C1 and a time variation of the voltage of the first protective element 41. The second loss current I2 is equal to a value, which is calculated by multiplying the second capacitance C1 and a time variation of the voltage of the second protective element 42. The time variation of the voltage applied to the first protective element 41 is equal to a value, which is calculated by differentiating the voltage difference V1-V2, which is the inter-terminal voltage of the gas concentration sensor 200, by time. The time variation of the voltage applied to the second protective element 42 is equal to a value, which is calculated by differentiating the voltage difference V2-V3, which is the inter-terminal voltage of the current detection resistor 20, by time. Since the capacitances C1 and C2 of the protective elements 41 and 42 are equal to each other as described above, the following relation expressed as equation [2] holds. This relation indicates that the ratio between the first loss current I1 and the second loss current I2 is equal to the ratio between the voltage variation of the first protective element 41 and the voltage variation of the second protective element 42.

$$I1:I2=(V1-V2):(V2-V3) \qquad [2]$$

From the relations [1] and [2], the second loss current I2 is expressed as the following equation [3].

$$I2=(V2-V3)(Isw-Ide)/(V1-V3) \qquad [3]$$

Since the sensor current Ise is divided into the second loss current I2 and the detection current Ide as described above, the following equation [4], which indicates that the sensor current Ise is equal to a sum of the second loss current I2 and the detection current Ide, holds.

$$Ise=I2+Ide \qquad [4]$$

For the reasons described above, by substituting the second loss current I2 represented by the equation [3] into equation [4], the sensor current Ise is expressed as the following equation [5].

$$Ise=Isw(V2-V3)/V1-V3)+Ide(V1-V2)/(V1-V3) \qquad [5]$$

The processing circuit 30 thus calculates the sensor current Ise based on the currents Isw, Ide, the voltages V1 to V3 and the equation [5]. The processing circuit 30 calculates the impedance of the gas concentration sensor 200 based on the sensor current Ise calculated as described above and calculates the temperature of the gas concentration sensor 200 based on the impedance and the temperature characteristic of the gas concentration sensor 200.

When the capacitances C1 and C2 are not equal to each other, a relation holds that the ratio between the first loss current I1 and the second loss current I2 is equal to the ratio between the value of multiplication of the voltage variation of the first protective element 41 and the capacitance C1 and the value of multiplication of the voltage variation of the second protective element 42 and the capacitance C2. The equation [2] therefore is expressed as the following equation [6].

$$I1:I2=C1(V1-V2):C2(V2-V3) \qquad [6]$$

Thus the equation [3] is expressed as the following equation [7].

$$I2=C2(V2-V3)(Isw-Ide)/\{C1(V1-V2)+C2(V2-V3)\} \qquad [7]$$

The equation [5] is expressed as the following equation.

$$Ise=Isw/[1+C1(V1-V2)/\{C2(V2-V3)\}]+Ide/[1+C2(V2-V3)/\{C1(V1-V2)\}] \qquad [8]$$

The control unit 100 according to the present embodiment provides the following operation and advantage. As described above, the sensor current Ise, which actually flow in the gas concentration sensor 200 is divided into the second loss current I2 and the detection current Ide. As a result, in a comparative example case that the detection current Ide is assumed to be the sensor current Ise, the accuracy of detecting the current flowing in the gas concentration sensor 200 is lowered. The control unit 100 however calculates the second loss current I2 based on the currents Isw, Ide, the voltages V1 to V3 and the relations expressed as the equations [1], [2]. By adding the detection current Ide to the calculated second loss current I2 as indicated by the equation [4], the sensor current Ise is calculated as indicated by the equation [5]. For this reason, the accuracy of detecting the sensor current Ise is enhanced in comparison to the comparative example case described above.

The first protective element 41 and the second protective element 42 have the same capacitances. In this case, the sensor current Ise is expressed by the equation [5]. When the capacitances of the first protective element 41 and the second protective element 42 differ from each other, the sensor current Ise is expressed by the equation [8]. As understood from comparison of equations, the equation [5] does not include a capacitance differently from the equation [8]. For this reason, the calculation of the sensor current Ise is simplified in comparison to a case, in which the capacitances of the first protective element 41 and the second protective element 42 are different.

The processing circuit 30 calculates the impedance of the gas concentration sensor 200 based on the calculated sensor current Ise. Since the accuracy of detection of the sensor current Ise is enhanced as described above, the accuracy of calculation of the impedance is also enhanced.

The processing circuit 30 calculates the temperature of the gas concentration sensor 200 based on the calculated impedance of the gas concentration sensor 200. Since the accuracy of detection of the sensor current Ise is enhanced as described above, the accuracy of calculation of the temperature is enhanced similarly.

It is simulated how much the accuracy of detecting the sensor current Ise is enhanced actually. In a case that the detection current Ide is assumed to be the sensor current Ise as described above, the impedance value actually deviated 5% from an expected value to be detected. However, in a case that the sensor current Is, which flows actually in the gas concentration sensor 200 is calculated based on the equations [5] and [8] as described above, the impedance value deviated only 0.23% or less from the expected value to be detected. Thus the accuracy of detecting the impedance is improved more than ten times.

The control unit 10, which is described above with reference to one preferred embodiment, is not limited to the above-described embodiment but may be implemented with various modifications.

In the present embodiment, the control unit 100 is exemplified to control the fuel injection system 400 for the internal combustion engine 300. However, the control unit 100 may be configured to control only the gas concentration sensor 200. In this modification, the control unit 100 is configured to calculate the air-fuel ratio and output the calculated air-fuel ratio to a different circuit, which controls the fuel injection system 400.

In the present embodiment, the control unit 100 is exemplified to control the two gas concentration sensors 200 provided upstream and downstream the three-way catalytic converter 500. However, the control unit 100 may control at least one of the gas concentration sensors 200.

In the present embodiment, the control unit 100 is exemplified to have the low limit voltage generation circuit 50. However, the control unit 100 need not have the low limit voltage generation circuit 50. In this case, the third voltage V3 included in the equations [1] to [8] is zero.

In the present embodiment, the sweep circuit 10 is exemplified to have the constant current circuits 11, 12 and the control circuit 13. However, the sweep circuit 10 is not limited to the configuration described above but may be in any configuration as far as it can supply the sweep current Isw shown in FIG. 3.

In the present embodiment, the protective elements 41 and 42 are exemplified to have the capacitances C1 and C2, which are equal to each other. However, the protective elements 41 and 42 may have capacitances C1 and C2, which are different from each other. In this case, the processing circuit 30 pre-stores the capacitances C1 and C2 and calculates the sensor current Ise by using the equation [8] in place of the equation [5].

The present embodiment is exemplified to calculate the sensor current Ise by calculating the second loss current I2 and then adding the detection current Ide to the calculated second loss current I2. However, as described above, the sweep current Isw is divided to flow into the first protective element 41 and the gas concentration sensor 200. For this reason, the sensor current Ise may be calculated by calculating the first loss current I1 and then subtracting the calculated first loss current I1 from the sweep current Isw. This first loss current I1 may be calculated based on the equations [1] and [2]. Alternatively, the first loss current I1 may be calculated based on the equations [1] and [6].

What is claimed is:

1. A control circuit for the gas concentration sensor comprising:

a sweep circuit for supplying a sweep current to a gas concentration sensor, a current value of the sweep current being variable with time;

a current detection resistor for detecting a sensor current flowing in the gas concentration sensor;

a calculation circuit for calculating an impedance of the gas concentration sensor based on the sensor current flowing in the gas concentration sensor and an inter-terminal voltage of the gas concentration sensor;

protective elements for suppressing external noise from being applied to the sweep circuit and the calculation circuit;

a first grounding wire connected to a first wire, which connects the sweep circuit and a first terminal of the gas concentration sensor; and a second grounding wire connected to a second wire, which connects a second terminal of the gas concentration sensor and the current detection resistor, wherein the protective elements includes a first protective element and a second protective element, the first protective element being provided in the first grounding wire and causing the sweep current supplied from the sweep circuit to be divided to flow to the first protective element and the gas concentration sensor, and the second protective element being provided in the second grounding wire and causing the sensor current flowing in the gas concentration sensor to be divided to flow to the second protective element and the current detection resistor, and wherein the calculation circuit calculates a first loss current flowing to the first protective element or a second loss current flowing to the second protective element, and calculates the sensor current flowing in the gas concentration sensor by using a calculated loss current.

2. The control circuit according to claim 1, wherein:

the calculation circuit calculates the second loss current flowing to the second protective element based on the sweep current supplied from the sweep circuit, a detection current flowing in the current detection resistor, a first terminal voltage supplied between the sweep circuit and the first protective element, and terminal voltages of the current detection resistor.

3. The control circuit according to claim 2, wherein:

the control part calculates the second loss current, which flows to the second protective element, based on two relations, one relation indicating that a ratio between the first loss current flowing in the first protective element and the second current flowing in the second protective element is equal to a ratio between a value of multiplication of a voltage variation of the first protective element and a capacitance of the first protective element and a value of multiplication of a voltage variation of the second protective element and a capacitance of the second protective element, and other relation indicating that the current flowing in the current detection resistor is equal to a current, which is determined by subtracting from the current supplied from the sweep circuit the current flowing in the first protective element and the current flowing in the second protective element.

4. The control circuit according to claim 3, wherein:

the first protective element and the second protective element have same capacitances; and a ratio between the first loss current flowing in the first protective element and the second loss current flowing in the second protective element is equal to a ratio between the voltage variation of the first protective element and the voltage variation of the second protective element.

5. The control circuit according to claim 1, wherein:

the calculation circuit calculates the impedance of the gas concentration sensor based on a calculated current actually flowing in the gas concentration sensor and a difference value of two voltages, one of which is between the sweep circuit and the first protective element and other of which is between the second protective element and the current detection resistor.

6. The control circuit according to claim 5, wherein:

the calculation circuit pre-stores a temperature characteristic of the impedance of the gas concentration sensor and calculates a temperature of the gas concentration sensor based on a stored temperature characteristic and a calculated impedance.

* * * * *